UNITED STATES PATENT OFFICE.

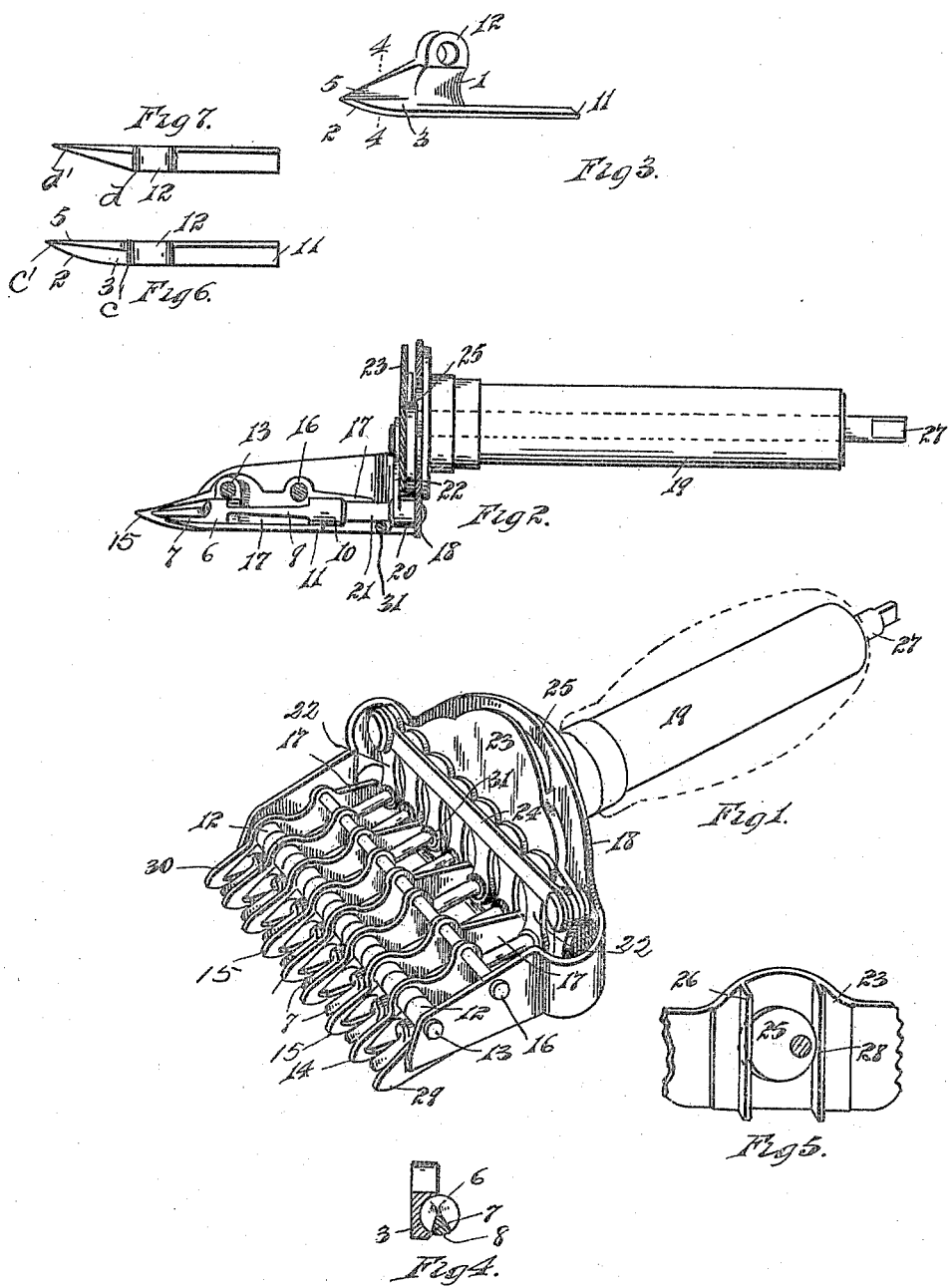

JAMES D. SCOVEL, OF DETROIT, MICHIGAN.

ANIMAL-SHEARS.

No. 817,524.  Specification of Letters Patent.  Patented April 10, 1906.

Application filed May 29, 1905. Serial No. 262,739.

*To all whom it may concern:*

Be it known that I, JAMES D. SCOVEL, a citizen of the United States, residing at Detroit, county of Wayne, State of Michigan, have invented a certain new and useful Improvement in Animal-Shears; and I declare the following to be a full, clear, and exact description of the invention, such as will enable others skilled in the art to which it pertains to make and use the same, reference being had to the accompanying drawings, which form a part of this specification.

This invention relates to animal-shears.

It has for its object an improved power-driven shearing implement especially useful in shearing sheep.

In the drawings, Figure 1 is a perspective of the complete implement. Fig. 2 is a longitudinal section. Fig. 3 is a detail showing a part of one of the shears. Fig. 4 is a cross-section at the line 4 4 of Fig. 3. Fig. 5 is a detail showing the crank mechanism which drives the cutters. Fig. 6 shows correct shape of the shear part of the tubular blade. Fig. 7 shows an incorrect shape of same.

The implement consists of a number of cutting-shears, and each shear has an oscillating blade which cuts against a fixed blade that is formed from a portion of a tube. The cutting part of the oscillating blade is a part of a cylinder sharpened on two edges and which oscillates in a tubular counterpart with two sharpened edges which meet at the rear and diverge toward the forward point or cutting edge. The tube itself is made in two parts or split.

Referring to the drawings, 1 indicates the tubular part of the shears, of which each half is provided with sharpened edge 2, which forms a continuation of the tubular surface 3. Back of the edge 2 is a clearance-space 5. The oscillating blade has a cylindrical part 6, that engages closely in the tubular part 3, and beyond the cylindrical part has a sharpened segment with edges 7, behind each of which there is a clearance 8. The front of the oscillating blade is carried on a thin connector 9, which unites the front to a rear cylindrical part 10, that bears on a tailpiece 11, and the tailpiece 11 forms a rear projection from the tubular part 3. Each half of the split tube which forms the fixed part of the cutter is provided with a tailpiece. The tailpiece 11 has a slight resiliency, and also the connecting-bar 9, which connects the front to the rear of the oscillating blade, has a slight resiliency; and the cylindrical part 10, bearing against the tailpiece 11, holds the two blades in resilient engagement and allows a constant interregulation or frictional adjustment between them. The fixed piece is provided with an ear 12, through which a tie-rod 13 of the frame engages. Two pieces, called "fixed shear-blades," are required to act with a single oscillating shear-blade to complete one shears. This combination of three shear-pieces is separated from a similar combination by a parting-strip 14. The point of the parting-strip projects forward beyond the shear-blades, forming a pilot-point or a dividing-point 15 and also serving to stiffen and support the tie-rod 13. The parting-strips 14 are provided with holes that engage over the tie-rod 13 and with holes that engage over a second tie-rod 16. One-half of the parting-strips terminate just behind the second tie-rod 16, and one-half of the strips are each provided with a rear extension 17, that engages in the plate 18, which forms the cross-plate at the rear of the frame part of the structure just in front of the handle 19. Each of the oscillating shear-blades is provided between the cylindrical part 10 and a cylindrical part 20 near the extreme rear with a neck part 21, the purpose of which will be mentioned hereinafter.

From the cylindrical part 20 a crank 22 rises in front of an oscillating plate 23, and the several terminals of the cranks are each provided with enlarged heads that fill the space across the plate 23, bringing the terminals of the several cranks into contact. The several cranks are held between the plate 23 and a bar 24, that reaches across the plate in front of the cranks.

The plate 23 is oscillated by an eccentric 25, located at the rear of the plate 23 between shoulders 26 and 28 and rotated by a shaft 27, that passes longitudinally through the handle 19. Rotative movement is given to the shaft 27 by flexible shafting or in any other convenient way. The two strips at the sides 29 and 30, similar to the parting-strips, hold a cross-bar 31, that engages under the neck portion of the oscillating blades and prevents these blades from slipping forward. Each of the oscillating blades is journaled at its extreme rear in the cross-plate 18 of the frame.

The alternate parting-strips 14—those which have rear extensions—are provided with oval holes, through which the tie-rod 13 engages, and if the tie-bar 16 be withdrawn the entire cutting part of the device may be slipped forward still assembled on the tie-rod 13 and may slip forward until the rear bearings for both the oscillating blades and the parting-strips are free from the cross-plate 18, and when in this condition the blades—both the oscillating blades and the fixed blades—may be swung clear from the rear cross-bar of the frame, and then any one of the blades may be swung independently, and any one or all of the oscillating blades may be removed.

The rotation of the shaft 27 vibrates the plate 23, swings the crank-arms of the oscillating blades, and oscillates the blades themselves sufficiently to cause them to coact with the fixed blades to cut or clip hair or wool or similar substances through which the implement is pushed while the blades are oscillating. A very important feature of the structure is the clearance on the oscillating blade behind the cutting edge and the clearance on the fixed blade behind the cutting edge, and another very important feature is the spring tension between the fixed and the oscillating blades, which causes the cutting parts to bear tightly against each other under spring tension and allows them to yield as the edge of one works over the edge of the other, and it is to be noted that to promote this the tail part 11 is sprung up slightly from a true continuation of that portion of the tube through which the cutting part of the oscillating blade engages. This of course is very slight and cannot be well shown in a drawings.

I find from practice that the grinding of the cutting edge of the tubular part of the shear-blade is important and that it should be ground as shown in Fig. 6 rather than as shown in Fig. 7, in which the cutting edge is shown between the points $c$ $c'$ in Fig. 6 and between $d$ $d'$ in Fig. 7, the cutting edge being somewhat arched, and this forms, with the edge of the oscillatory knife, an angle more obtuse than the angle which would be formed by grinding the blade as shown in Fig. 7. While blades ground in either form will cut, a blade ground in the form shown in Fig. 6 cuts to much better advantage.

What I claim is—

1. In an animal-shears, a shearing member having in combination a tubular part notched and with the edges of the notch sharpened for cutting purposes, an oscillating part adapted to oscillate within the tubular part and provided with a cutting projection adapted to oscillate in engagement with the sharpened edges of the notch, and means for producing the oscillation of the said oscillating part, substantially as described.

2. In an animal-shears, a cutting section thereof having in combination a split tubular member, means for supporting said member intermediate its extremities, the part in front of the support being notched and with the edges of the notch sharpened, and a part at the rear of the support extending and being resilient, an oscillating member adapted to coact with the tubular member provided with a cylindrical bearing to engage the tubular member in front of the support and with a second cylindrical bearing to engage the rear extension of the tubular member, and with a resilient connection between the two tubular bearing parts, substantially as described.

3. In an animal-shears, in combination with the main frame, tubular shearing members supported on a cross-bar in said main frame, oscillating shearing members bearing in said tubular shearing members and having a second bearing in said frame, and means for oscillating said cylindrical shearing members, substantially as described.

4. In an animal-shears, in combination with a framework, tubular shearing members pivotally supported in said frame, cylindrical shearing members journaled in said tubular shearing members and in said frame, means whereby said cylindrical shearing members may shift and thereafter in connection with the tubular members swing on said pivotal bearings, substantially as described.

5. In an animal-shears, in combination with a main frame, a plurality of cutting members having oscillating blades journaled in the main frame, means for shifting the cutting members unitedly to disengage the journals from the frame and swing the cutting members with respect to the main frame, substantially as described.

6. In an animal-shears, in combination with a plurality of cutting shear members, a plurality of parting-strips, tie-rods uniting the parting-strips, alternate parting-strips being provided with rear extensions that engage the main case, and with oval perforations engaging over a tie-rod, all of said parting-strips being provided with registering circular holes to engage a tie-bolt, whereby upon withdrawing the said last-mentioned tie-bolt the said alternate parting-strips may be shifted out of engagement with the frame, substantially as described.

7. A cutting member for an animal-shears, having in combination a two-part tubular blade and a cylindrical blade engaging in the tubular blade, the cutting edge of the two-part tubular blade being curved, substantially as described.

8. A cutting member for an animal-shears, having in combination a two-part tubular blade and a cylindrical blade engaging in the tubular blade, the cutting edge of the two-part tubular blade being curved and provided with clearance behind the curved cutting edge, substantially as described.

In testimony whereof I sign this specification in the presence of two witnesses.

JAMES D. SCOVEL.

Witnesses:
CHARLES F. BURTON,
MAY E. KOTT.